United States Patent
Conley (10) Patent No.: US 9,097,902 B2
(45) Date of Patent: Aug. 4, 2015

(54) AUTOSTEREOSCOPIC FRAME DEVICE FOR REMOVABLE ATTACHMENT TO DISPLAY PANEL

(71) Applicant: Kenneth Conley, Indian Trail, NC (US)

(72) Inventor: Kenneth Conley, Indian Trail, NC (US)

( * ) Notice: Subject to any disclaimer, the term of this patent is extended or adjusted under 35 U.S.C. 154(b) by 335 days.

(21) Appl. No.: 13/832,700

(22) Filed: Mar. 15, 2013

(65) Prior Publication Data

US 2013/0201554 A1 Aug. 8, 2013

Related U.S. Application Data

(60) Continuation-in-part of application No. 12/871,307, filed on Aug. 30, 2010, which is a continuation-in-part of application No. 12/364,614, filed on Feb. 3, 2009, now Pat. No. 7,808,711, and a division of application No. 11/512,451, filed on Aug. 30, 2006, now Pat. No. 7,660,041.

(51) Int. Cl.
*G02B 27/10* (2006.01)
*G02B 27/22* (2006.01)
*H04N 13/04* (2006.01)

(52) U.S. Cl.
CPC ........ *G02B 27/2214* (2013.01); *H04N 13/0404* (2013.01); *H04N 2213/001* (2013.01)

(58) Field of Classification Search
USPC ......... 359/463, 262, 242, 244, 267, 277, 811, 359/813, 815, 819, 822–824; 348/51, 54, 348/59, E13.001, E13.012
See application file for complete search history.

(56) References Cited

U.S. PATENT DOCUMENTS

| | | | |
|---|---|---|---|
| 7,660,041 B1 | 2/2010 | Conley | |
| 7,808,563 B2 | 10/2010 | Sanchez | |
| 8,253,780 B2 | 8/2012 | Raymond et al. | |
| 2009/0141123 A1* | 6/2009 | Conley | 348/59 |
| 2009/0141437 A1 | 6/2009 | Geiger et al. | |
| 2009/0213210 A1* | 8/2009 | Conley | 348/59 |
| 2010/0321776 A1* | 12/2010 | Conley | 359/463 |
| 2012/0229718 A1 | 9/2012 | Huang et al. | |

* cited by examiner

Primary Examiner — Joseph P Martinez
Assistant Examiner — Brandi Thomas (57) ABSTRACT

An auto stereoscopic frame system and the associated method of manufacturing is disclosed. The frame system generally comprises a frame defining an opening for housing a lens structure, said frame being operative for removable attachment to a display device which projects at least one image such that when the image is viewed through the lenticular sheet it is viewed in three dimensions. The frame is attached to the display device via a mounting mechanism. The lenticular sheet may be manufactured by providing a substantially transparent substrate material; forming a plurality of lenses on a first side of the substrate; and shaping the substrate to correspond to a display area of a display device, wherein the plurality of lenses are angled to correspond to the pixel size and pitch of the display area of a display device.

20 Claims, 5 Drawing Sheets

AUTOSTEREOSCOPIC FRAME DEVICE FOR REMOVABLE ATTACHMENT TO DISPLAY PANEL

CROSS-REFERENCE TO RELATED APPLICATION(S)

This application is a continuation-in-part application of U.S. patent application Ser. No. 12/871,307, filed Aug. 30, 2010, and entitled "LENS STRUCTURE AND METHOD OF PRODUCING AND DISPLAYING A THREE DIMENSIONAL IMAGE", which is a continuation-in-part application of U.S. patent application Ser. No. 12/364,614, filed Feb. 3, 2009, and entitled "METHOD OF PRODUCING AND DISPLAYING A THREE DIMENSIONAL IMAGE", which is a divisional application of U.S. Pat. No. 7,660,041, filed Aug. 30, 2006, and entitled "METHOD OF PRODUCING A SHEET HAVING LENTICULAR LENSES FOR A THREE DIMENSIONAL DISPLAY SYSTEM," the contents of which are incorporated in full by reference herein.

BACKGROUND OF THE DISCLOSURE

1. Field of the Invention

The present disclosure relates generally to a three dimensional display devices, and more particularly, to an autostereoscopic frame device having an incorporated lens structure for removable attachment to a display panel such that images viewable through the frame device are displayed in three dimensions.

2. Technical Background

Various methods and apparatus for forming a three dimensional image when viewed are known in the art, particularly as it relates to three dimensional video or television viewing. As is understood by those skilled in the art, the term "three dimensional," is an image of an object, or arrangement of objects, to have an appearance of height, width and depth. This contrasts with conventional photographs, videos and unmodified digital format conversions of the same, which display the dimensions of height and width but, for reasons including lack of parallax, do not display a true image of depth. Such images are known as two dimensional images.

There are at least two known methods for recording, arranging and re-formatting two-dimensional photographic images, or pluralities thereof (i.e, video content), onto a flat medium or display screen, such as a television, that when viewed create an impression of depth. One is commonly known as the "3-D glasses" method. In its simplest form, a scene is photographed with two cameras, one corresponding to a person's left eye and one corresponding to a person's right eye. The developed pictures, or sequence of pictures for a movie, taken by the two cameras are then projected, one image atop the other, onto a flat screen through two respective projector lenses. The projector lenses apply a different color or polarization to the left and right image, with respect to one another, before overlaying them on the viewing screen. The viewer then wears special glasses that filter, by color or polarization, the overlaid images such that his or her left eye sees only the image from the "left eye" camera, while his or her right eye sees only the image from the "right eye" camera. Because of the parallax between the image seen by the left eye and right eye, the viewer senses an apparent depth, i.e., three dimensions.

There are, however, problems with the "3-D glasses" method. One problem is that the viewer must wear the special glasses. Another is that many viewers become nauseated due to visual distortions when viewing the picture.

A second known method for recording and transforming a two dimensional image, photograph or video onto a different medium which displays it to have apparent depth is the autostereoscopic or lenticular lens method. The optical principles of lenticular screen imaging are well known to one of ordinary skill in the relevant art. The lenticular lens method typically interlaces different images or viewing angles of a single image, using a raster type interlacing, and then places a sheet formed of a plurality of elongated strip lenses, or lenticules, over the raster image. The overlay is such that each lenticule or lens overlays raster lines. The lenticules are formed such that one image is presented to the viewer's left eye and another image is presented to the viewer's right eye. The difference between the left image and the right image approximates the parallax that the viewer would have experienced if viewing the original image in person.

Increasingly, it has become desirable to produce a three dimensional images or videos on a display device such as a computer monitor, a handheld device, a smartphone, or a television screen. This increase in desirability is premised upon the desire to view television programs, games, movies or other video content in three dimensions (commonly referred to as "3D TV"). The increase in demand relates not only to entertainment means, but also to tools useful in the fields of medicine, manufacture, security, modeling and simulation, and service/repair.

Various methods, apparatus and systems are known in the art which overlay a lenticular lens on the display device such that a two dimensional image being displayed on the device will appear to have a three dimensional effect. Unfortunately, the known methods, apparatus and systems suffer several shortcomings. By way of example, known methods, apparatus and systems have heretofore not provided an aesthetically pleasing frame device configured for removable attachment to a display device and an adequate manner of interlacing the images to accommodate for the pixel size and pitch of the display device upon which it is being projected. By way of another example, known methods, apparatus and systems do not disclose a manner of producing a lenticular lens which produces a high clarity three dimensional image at the display device, with the lenticular lens being housed within an opening defined by a frame device that is configured to be removably connected to a display device.

Accordingly, there is a need in the art for a frame device incorporating a lenticular sheet such that the sheet, when the frame is removably attached to a display device, corresponds to the pixel size and pitch of the display device. For such devices, is would be desirable to provide an improved three dimensional display system which includes a display device for projecting at least one image and a removable frame device operable for attachment to the display device and having a high clarity lenticular sheet incorporated therein; wherein once the frame device is attached to the display device, the at least one image may be viewed in three dimensions.

SUMMARY OF THE DISCLOSURE

To achieve the foregoing and other objects, and in accordance with the purposes of the disclosure as embodied and broadly described herein, the present disclosure provides various embodiments of a frame incorporating a lens structure and the associated method for manufacturing, the same and being operable for removable attachment to a video display device of a three dimensional display system. To facilitate higher clarity in viewing the desired visual effects, the lenticular sheet of the present disclosure is preferably produced with a configuration that corresponds to the pixel size and pitch of the video display device. Further, to facilitate higher clarity in viewing the desired visual effects, the lenticular sheet is provided with a lower viewing angle than that provided by conventional methods and systems such that the resolution of an image displayed on the video display device is accommodated. Still further, to facilitate higher clarity in viewing the desired visual effects, the lenticular sheet is capable of being adjusted within the frame such that a proper alignment with the display screen is achieved after attachment.

In various embodiments, the present disclosure provides a lenticular sheet housed within a frame, the lenticular sheet having plurality of lenses located thereon and extending in an angled configuration. In various embodiments, the lenticular sheet is first affixed to a glass substrate and incorporated into the frame such that the glass substrate serves as an outer layer. In various embodiments, the lenticular sheet is first affixed to a glass substrate and incorporated into the frame such that the lenticular sheet serves as an outer layer. In such embodiments, a spacer may be provided to position the lenticular sheet at an optimal focal distance from the displayed image.

According to an exemplary embodiment, a lens structure or lenticular sheet and a three dimensional display system is provided wherein the lens structure or lenticular sheet is produced by the steps of obtaining predetermined values corresponding to the pixel size, resolution and pitch of a video display device. Based upon these predetermined values, an image which has been recorded and interlaced is resized to correspond to the video display device through the use of an interlacing and resizing software program of the type commonly available in the industry. Alternatively, an image is recorded and interlaced at a size corresponding to the display device. Once interlaced, the image is stored in a computing device.

Thereafter, a cutting tool is formed and used to engrave a predetermined lens pattern into a metal cylinder or plate at the desired area. The engraving of the cylinder or plate is performed in any known conventional manner of engraving. The lens pattern, as engraved into the cylinder, is then polished to achieve an optimal optical surface. Thereafter, the lens pattern is transferred to a desired side of a flexible, transparent plastic sheet at a desired location by using an extrusion nip when the sheet is formed or at an embossing nip with a preformed and heated plastic sheet, or by casting if made from an ultra violet light curing resin or with other curable resins. Subsequent to the embossing of the resulting lenticular sheet, the sheet is formed into a shape such that the size of the sheet corresponds to the dimensions of the video display device and so that lenticules of the sheet are angled to correspond to the pixel size and pitch values of the video display device.

The lenticular sheet is then cast or laminated to a stable biaxial oriented and heat stabilized film or glass substrate. In exemplary embodiments, the film is a PET film. Thereafter, the lenticular sheet is connected to a frame having a top portion, a bottom portion and two side portions, said frame defining an opening for receiving the lenticular sheet. In exemplary embodiments, the frame includes at least one aperture extending therethrough for allowing access to controls of a display device. In exemplary embodiments, the frame may also be provided with alignment slots or mounting holes for receiving at least one set screw or other suitable mechanism. The frame is configured to be removably attached to the video display device such that the image may be transmitted to the video display device from a data source and projected on the display device for viewing in three dimensions through the lenticular sheet.

A method of manufacturing the frame and the lenticular sheet is also disclosed.

Additional features and advantages of the disclosure are set forth in the detailed description which follows and will be readily apparent to those skilled in the art from that description, or will be readily recognized by practicing the disclosure as described in the detailed description, including the claims, and the appended drawings. It is also to be understood that both the foregoing general description and the following detailed description present exemplary embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure, and together with the detailed description, serve to explain the principles and operations thereof. Additionally, the drawings and descriptions are meant to be merely illustrative and not limiting the intended scope of the claims in any manner.

BRIEF DESCRIPTION OF THE DRAWINGS

The foregoing and other objects, aspects, and advantages will be better understood from the following description of exemplary embodiments of the disclosure with reference to the drawings, in which.

DETAILED DESCRIPTION

Reference will now be made in detail to exemplary embodiments of the disclosure, which are illustrated in the accompanying drawings. Whenever possible, the same reference numerals will be used throughout the drawings to refer to the same or like parts. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The various embodiments of the present disclosure may be applied in any known lenticular manufacturing system. As is well known and understood in the art, lenticular lens material utilizes rows of simple and commonly dome-shaped lenses, lens elements or "lenticules" in combination with a lineform or interlaced image, to create the desired visual effect. As used herein, the term "lenticular sheet" is intended to include any optical sheet, roll, film or material that is suitable for use in the printing arts and has a substantially transparent quality. Material compositions of such sheets may include, for example and without limitation, polypropylene, polyester, polyethylene, polyvinylchloride, and polystyrene. All such compositions are considered to be polymeric sheet materials and are synonymous therewith. In one example, the lenticular sheet generally comprises a flat side and a lenticulated side including the lenticules.

Figure 1:
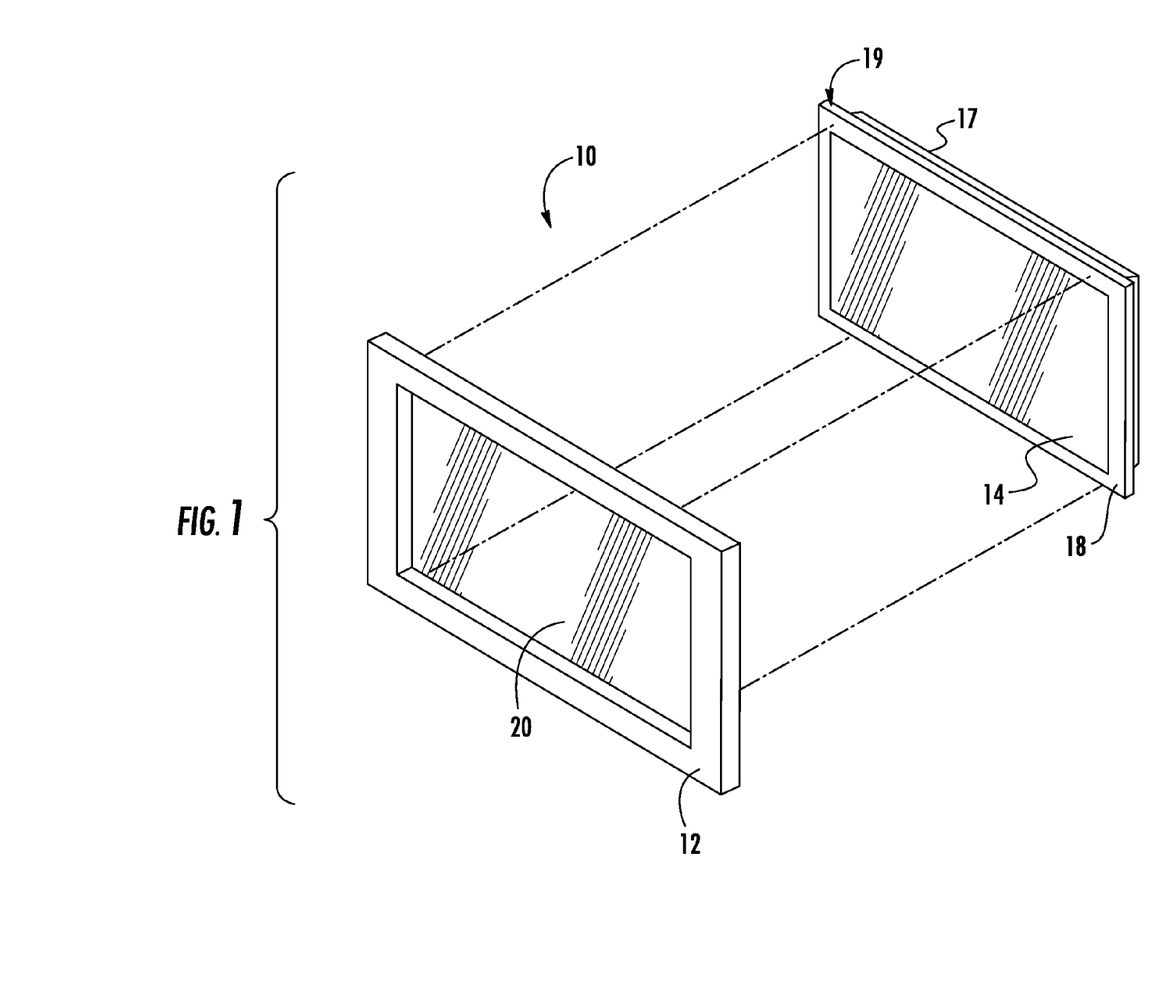
FIG. 1 is an exploded, perspective view of a frame incorporating a lenticular sheet and removably attached to a display device constructed in accordance with an exemplary embodiment of the present disclosure and illustrating the various components thereof.
Figure 2:
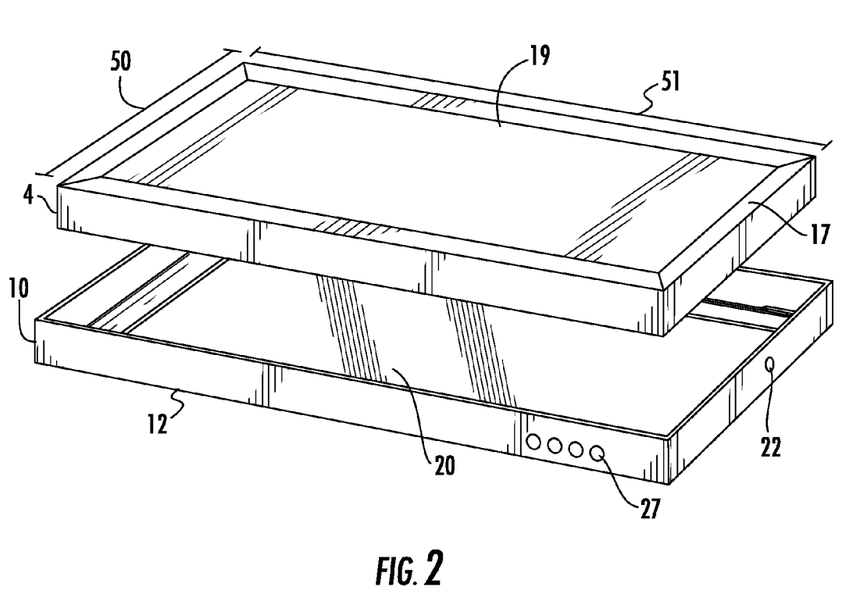
FIG. 2 is an exploded, perspective view of a frame incorporating a lenticular sheet and removably attached to a display device constructed in accordance with an exemplary embodiment of the present disclosure and illustrating the various components thereof.

The present disclosure, in one embodiment, provides an autostereoscopic frame defining an opening and having a lenticular sheet incorporated therein, said frame being configured for removable attachment to a display device such that a three dimensional view of an image projected by the display device may be viewed. In other embodiments, a method of manufacture and attachment for the frame and the lenticular sheet to a display device such that three dimensional images may be viewed on a conventional video display device in sequence is disclosed. Referring now to FIGS. 1 and 2, an exploded, perspective views of an autostereoscopic frame incorporating a lenticular sheet and operable for removable attachment to a display device constructed in accordance with an exemplary embodiment of the present disclosure is illustrated.

As shown, an autostereoscopic frame system 10 includes a frame 12 defining an opening that is configured to receive and maintain a lenticular sheet 20, a display device 19 having a housing 17 for housing electronic components (not shown) and a display panel 18 for displaying images 14 projected by the display device 19, and at least one mounting mechanism 16 operable for removably attaching the frame 12 to the display device 19 such that the images 14 maybe viewed as a sequence of three dimensional images. In exemplary embodiments, at least one alignment mechanism is provide whereby the lenticular screen 20 may be adjusted relative to the display screen 18 to enhance the view of the image 14. In other exemplary embodiments, the frame 12 may be formed by a plurality of rails affixed together.

In exemplary embodiments, the flat panel display device 19 may be of any conventional construction is shown and includes the housing 17 surrounding a central display screen or viewing area 18. The frame 12 may be formed of any suitable material and may have any suitable configuration, the frame 12 defining an opening of a size to receive and maintain the lenticular screen 20 and allow viewing thereof while covering the display device 19. The frame 12 may be releaseably and removably attached to the display device 19 and held in place by the mounting mechanism 16.

Figure 3:
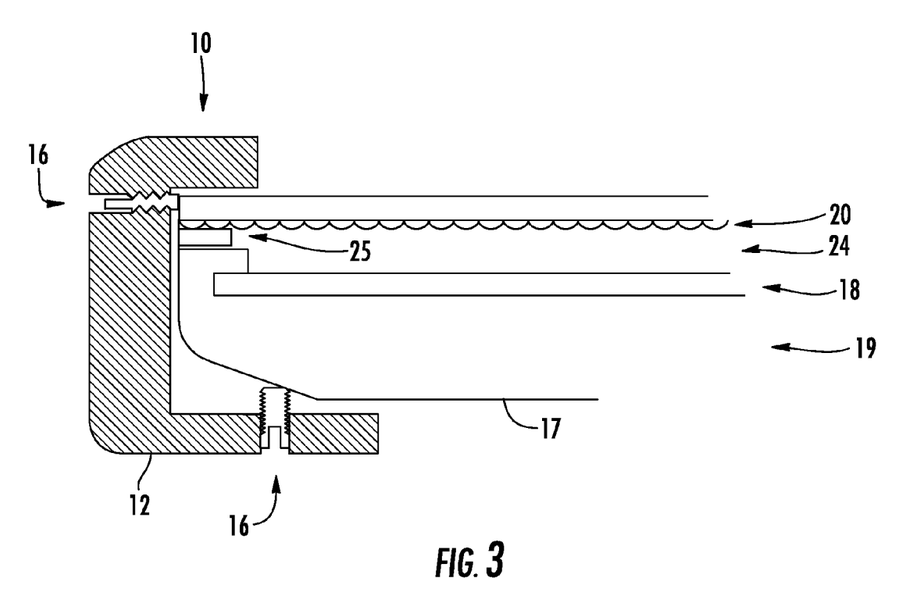
FIG. 3 is a cross-sectional view of a frame incorporating a lenticular sheet and removably attached to a display device constructed in accordance with an exemplary embodiment of the present disclosure.

As best shown in FIG. 3, various exemplary embodiments of the present disclosure may include the frame device 12 being operatively associated with the display device 19 and held in place via the mounting mechanism 16 and a configuration of the frame 12 itself. The frame 12 may be configured to form a confining rail type arrangement surrounding and engaging the display device 19. In addition, the mounting mechanism 16 may be any one fasteners, brackets, screws, snaps, latches, connectors or the like. In exemplary embodiments, either or both of the mounting mechanism 16 and the frame 12 may be configured to allow the lenticular sheet 20 to be positioned adjacent to or near the display screen 18 and in a plurality of distances from the outer surface thereof as measured from the back surface of the lenticular sheet 20, e.g., the mounting mechanism 16 or the frame 12 configuration may allow the lenticular sheet 20 to be pushed toward the display screen 18, pivoted toward and away from the screen 18, or otherwise manipulated to move through a range of spaces or offset distances (which typically leave an air gap 24 between the screen 18 and the sheet 20).

In the exemplary embodiments shown herein, the lenticular sheet 20 is positioned in a manner which has the lenticules of the sheet 20 facing the display screen 18. In such embodiments, a spacer 25 may be provided to position the lenticular sheet 20 at an optimal focal distance from the displayed image 14. By positioning the lenticular sheet 20 in this manner tactile or touch screen capabilities may be introduced or enhanced. Further, this configuration will provided increased protection to the display device and abrasion resistance. It will be appreciated by those skilled in the art that other suitable configurations may be employed such as having the lenticules facing away from the display screen. In such embodiments, the lenticular sheet 20 will be affixed to a substrate and maintained within the frame 12 and the need for a spacer 25 may be obviated.

In exemplary embodiments described herein, the display device 19 and the lenticular sheet 20 are configured to correspond in size such that the quality of the viewed images is optimized. The display device 19 can be any commercial available device used for display photographic or video images including, computer monitors, LCD's, CRT's, televisions, handheld devices, smartphones or the like. In exemplary embodiments, a display device 19 having a flat screen 18 is used such that the frame 12 and lenticular sheet 20 may be easily attached thereto. By using the frame system 10 of the present disclosure, the use of "3-D" type glasses is obviated. Still further, by using the frame system 10 of the present disclosure, an aesthetically pleasing cover may be placed over a display device that provides a three dimensional view of images that more efficient and higher clarity sequence of images is provided over conventional and known methods and systems.

In exemplary embodiments of the present disclosure, the image 14 is recorded and prepared by using any conventional recording means including, for example, a digital camera device or the like having single or multiple lens thereon for recording numerous views of the image 14, such that the image 14 can be interlaced to provide the illusion of depth. In preferred embodiments, the image 14 is prepared by combining or interlacing selected images or video content on a data source such that the images 14 are produced in a manner ready for printing and/or viewing. Previously interlaced images made for printing and combining to a lenticular sheet may be used in the present disclosure by resizing the images to match the frequency or "pitch" of the lenticular sheet 20 that has been incorporated in tot frame 12 and placed over the display device 19. For recorded images which have not been previously interlaced, they are interlaced such that the resulting product corresponds to the pixel pitch and size of a video display device 19. Once interlaced, the images 14 are transmitted to the display device 19 through an input (not shown).

By providing a lenticular sheet 20 having angled lenticules, a frame display system 10 having a matched resolution in both the horizontal and vertical configuration can be achieved. This produces a three dimensional image that has superior clarity and brightness when compared to a traditional striped lenticular screen. Also, by providing a lenticular lens at a slant angle, higher clarity image may be viewed as a reduction in moiré and/or rainbow effects is produced.

In accordance with one exemplary embodiment of the present disclosure, the lenticular sheet 20 is fabricated by first designing a cutting tool, such as a stylus, with a desired lens shape. The cutting tool is preferably made of a diamond or carbide, however, it will be understood by those skilled in the art that any hard material suitable for engraving cylinders may be used. The shape of the cutting tool is dictated by the desired visual effect, however, in order to provide a higher clarity, a first radius is formed on either side of the distal end of the cutting tool and then a second, larger, radius is formed on the tip of the cutting tool.

Once the cutting tool is designed, the inverse lens shape is engraved into pre-selected portions of a flat plate or cylinder using any known, conventional method of engraving, thereby forming a plurality of inverse lens arrays or patterns. Preferably, the engraving processing includes the use of a computer operable for directing the cutting tool in both direction and depth such that an optimal lens pattern can be transferred into the plate or cylinder. Advantageously, by using the engraving process for the plate or cylinder, a variety of inverse lens patterns can be engraved into the plate or cylinder, thereby providing a variety of lens patterns embossed on the same sheet, including but without limitation, lens patterns having different shapes and lens patterns extending in different directions such as longitudinally and latitudinally from a certain axis.

Subsequent to engraving the plate or cylinder, the cylinder is placed into the lenticular system or process of manufacture. The inverse lens pattern is then transferred to a sheet material using known conventional extrusion embossment methods, thereby forming the lens pattern on the sheet in the desired areas only. Preferably, the sheet material is plastic. Further, it will be appreciated by those skilled in the art, that a variety of plastics can be employed, for example and without limitation, acrylics, polystyrenes, polycarbonates, polyesters, polyolefin's, polyvinyl chlorides and all such polymeric equivalent materials.

In exemplary embodiments, the produced lenticular sheet 20 has a thickness of about 0.005 inches to about 0.025 inches and not usually at the focal point of the pattern. Subsequent to the embossing of the resulting lenticular sheet 20, the sheet 20 is cast or laminated onto a stable biaxial and heat stabilized film. In exemplary embodiments, the film is PET. Thereafter, the lenticular sheet 20 is laminated to a polymeric material or a crystalline structure such as PC, Acrylli, PETG or glass. The thickness of the polymeric material or crystalline structure is dictated by the thickness of the lens sheet 20 and the thickness of a viewing panel of the display device 19 to place the focal point at the pixel level on the display device. The sheet 20 is then formed into a shape such that the size of the sheet corresponds to the dimensions (50 and 51) of the video display device 19 and so that lenticules or lens elements 100 of the sheet are angled to correspond to the pixel size and pitch values of the video display device 19. In exemplary embodiments, the lenticular sheet 20 is shaped to the size of the display device 19 by any conventional means, including but not limited to rotor cutting, press cutting, stamping, or the like.

Figure 4:
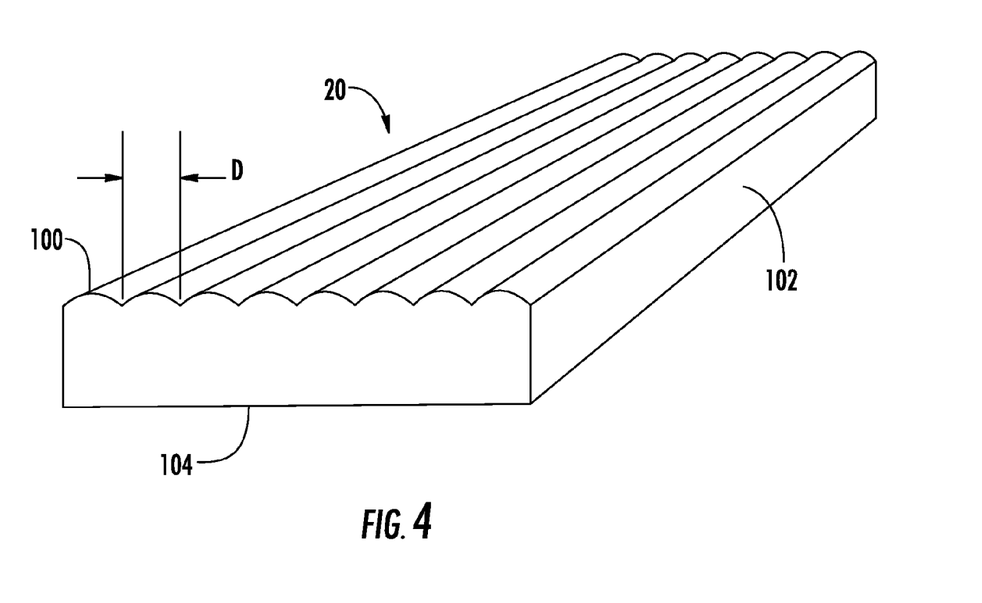
FIG. 4 is a perspective view of an exemplary portion of a lenticular sheet produced in accordance with an embodiment of the method of the present disclosure and operable for use with the system of the present disclosure.

Referring now to the drawings, FIG. 4 is a perspective view of a portion of a lenticular sheet 20. The sheet 20 is provided with a lens elements 100 that are cylindrical lenses with a circular cross section. The width of each lens is D. The lenticular sheet consists of a dielectric medium 102 with multiple convex lenses 100 formed on a viewer side. The dielectric medium 102 may be any transparent material, but is typically a clear plastic having good mechanical properties. The planar side of the array 104 contains a printed image that is commonly designed using a computer to be addressed by the sheet 20 and variation in a viewer's angle of regard.

Figure 5:
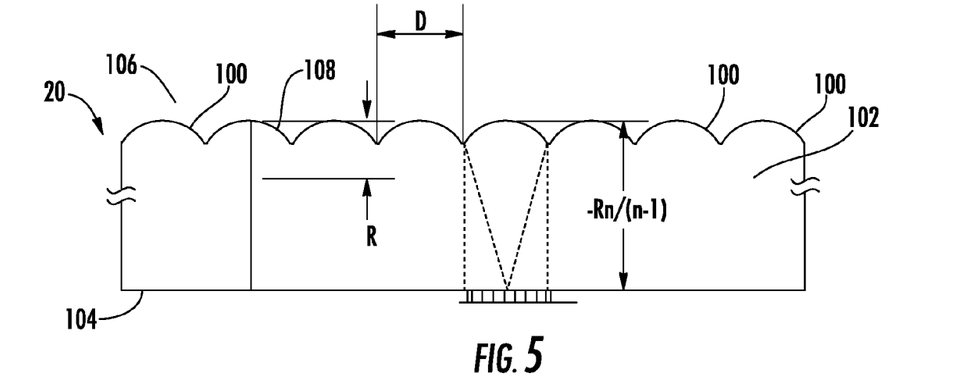
FIG. 5 is a cross-sectional view of the lenticular sheet shown in FIG. 4.
Figure 6:
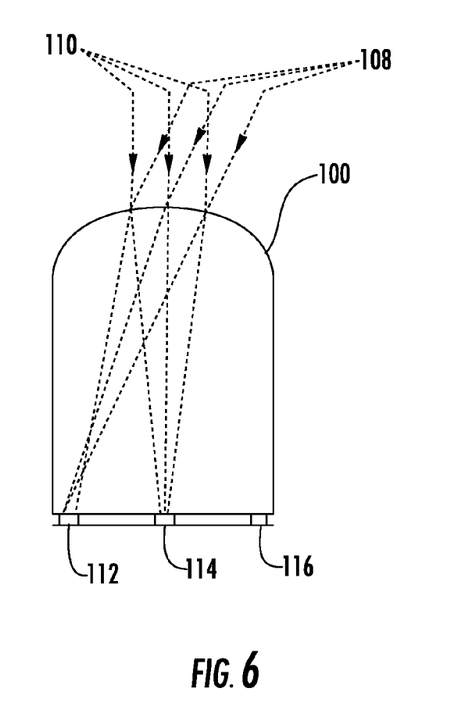
FIG. 6 is a cross-sectional view of a lens element of the lenticular sheet shown in FIG. 4.

FIG. 5 is a cross-sectional view of the lenticular sheet 20 shown in FIG. 4. The sheet 20 has dimensions MD×ND×∼nR/(n−1) where D is the width of a lens element 100 as best shown in FIG. 6, n is the index of refraction of the plastic material, R is the radius of the lens element 100 and R<D/2. M and N are product variables. In one example, an image may be presented, wherein M and N may be on the order of 50 to 100 or more. The actual dimension D depends on the design viewing distance and quality objectives. In exemplary embodiments, the actual dimension D is calculated by the following subtracting the thickness of the surface of the display device from the focal point of the lenticular sheet 20. In exemplary embodiments, the thickness is on the order of 250 mils.

The transparent material is commonly formed as a sheet with a lens array formed on the entirety of a front side 106, or a viewer side. The backside 104, or flat side, is considered a non-viewer side. The radius of the substantially circular cross section, R, is shown larger than the lens spacing D. The overall thickness of the array is:

$$\text{Thickness} \sim R \times n/(n-1)$$

where n is an index of refraction for the dielectric medium. The backside 104 is removably attached to a display device such that the lenticular sheet is aligned with the viewing portion of the display device.

The viewing angle of the lenticular sheet 20 and utilized by the present disclosure is determined by the following formulation:

$$\text{Angle} = 2 \text{ arc Tan } W/(2J/n)$$

where W is the lens width, J is the focal point, calculated from the radius and n is the index of refraction. For 3D images the viewing angle is inversely proportional to the amount of virtual depth that can be created with a lenticular lens. A larger viewing angle will provide less virtual depth and a smaller viewing angle will provide more virtual depth. Virtual depth is defined as the perceived distance either into or out of the viewing plane. The angle is substantially equal to the distance you would have to move for one image to flip to another. The smaller the number, the quicker the flip and the more suitable for 3D which has a number of images of the same scene from a slightly different angle. In exemplary embodiments, the viewing angles of the present disclosure are in the range of about 15 to 26 degrees. However, it will be understood by those skilled in the art that the viewing angles may be from about 3 to 40 degrees.

FIG. 6 is a cross-sectional view of the lens element 100 of the lenticular sheet 20 shown in FIG. 4. Since the viewer's eye is on the order of 4,000 times the radius of the lens cross section, an individual lens can be analyzed with negligible error by assuming that light rays at a first angle 108 and light rays at a second angle 110 are parallel. The lens 100 focuses the rays from a repertoire of angles onto a repertoire of printed regions. The light rays from the first angle 108 focus on a printed region 112. From symmetry, light rays at an angle that is negative with respect to a perpendicular to the sheet 20, if the angle 108 is defined as positive, focus on an area 114 that is mirrored from the centerline of the lens 100. Light rays from the second angle 110 focuses on and therefore select a second, independent area 116. If the repertoire of images has a defined number, the lens 100 must be capable of adequately focusing on a same number of independent areas. The actual repertoire of angles need not be a linear progression. If one marks off the projection of the lens 100 on the surface 104 in q centers where q is the number of images in the repertoire and then calculates the corresponding angles of regard, parallel rays at these angles must focus in a reasonably non-overlapping fashion on the surface at the best image plane compromise available. Non-compensated lenses will typically depart from the ideal. A measure of the quality of a lens is the standard deviation of a point from a spread of points that intersect the lens. If the standard deviation is such that focus areas overrun adjacent focus areas, the images seen will not be well defined in color and especially definition.

As stated above, the video display device 19 can be any known display device known in the art, including, but not limited to CRTs, LCDs, LCD projectors, plasma displays, flat panel television displays, portable handheld displays, smartphone displays and other devices. Flat screen display devices are preferred for ease in applying the lenticular sheet 20. When coupled to an LCD display system, the lenticular sheet 20 focuses the LCD pixel array at the cylinder-shape lens array focal plane. The lenticular sheet 20 refracts the light from the LCD pixel array so viewers observing the LCD images through the lenticular sheet see different images based on their angular position to the LCD.

The exemplary embodiments of the present disclosure are operable for presenting a desired three dimensional visual effect that serves as a significant improvement over the above described prior art methods and systems. In addition, the exemplary embodiments of the frame of the present disclosure provide certain advantageous including the provision of support for the lenticular sheet once it is laminated to the polymeric or crystalline material. Further, the exemplary embodiments of the frame of the present disclosure provide the ability to adjust and align the lenticular sheet in a variety of directions and angles to optimize the viewing of the image. Still further, the exemplary embodiments of the frame of the present disclosure may provide anesthetically pleasing décor about the display device. In addition, the exemplary embodiments of the present disclosure have multiple uses and benefits in various industries. For example, the produced images may be displayed in the form of a movie, television program, game, "screen saver", slide show, power point presentation, trade show and in store graphics or other such displays as medical diagnostics. A screen saver can be one or more chosen images which repeat continuously and are provided with the 3-D, morph or flip effects. A slide show can be from a collection of ones favorite 3-D images being played in succession. Added dramatic effects are achieved in a power point presentation. Trade show and in store graphics viewed on a monitor gather added attention while advertising a particular product.

It will be apparent to those skilled in the art that various modifications and variations can be made to the present disclosure without departing from the spirit and scope of the disclosure. Thus, it is intended that the present disclosure cover all conceivable modifications and variations of this disclosure, provided those alternative embodiments come within the scope of the appended claims and their equivalents.

What is claimed:

1. An autostereoscopic frame operable for removable attachment to a display device and for viewing at least one two dimensional image projected by the display device in three dimensions, comprising:
    a frame defining an opening for receiving and maintaining a lens structure, said frame being configured to correspond in size to dimensions of the display device and having at least one mounting hole extending therethrough;
    at least one mounting mechanism configured to engage and secure the frame to the display device; and
    wherein the lens structure comprises a transparent substrate material having a plurality of lenses located on one side thereof, the plurality of lenses being angled and corresponding to a pixel size and pitch of the display device such that when the frame is attached to the display device the at least one two dimensional image may be viewed in three dimensions.

2. The frame according to claim 1, wherein said at least one two dimensional image further comprises a series of images forming a video.

3. The frame according to claim 1, wherein the frame further includes an alignment mechanism operable for adjusting the position of the lens structure relative to the display device after the frame is attached to the display device.

4. The frame according to claim 3, wherein the alignment mechanism is a set screw which extends through an alignment slot locate on the frame.

5. The frame according to claim 1, wherein the mounting mechanism is any one of fasteners, brackets, screws, snaps, latches, or connectors.

6. The frame according to claim 1, wherein the lens structure has a thickness in the range of 0.005 to 0.025 inches.

7. The frame according to claim 1, wherein the plurality of lenses have a viewing angle in the range of 3 to 40 degrees.

8. The frame according to claim 1, wherein the substrate material of the lens structure is laminated to a polymeric material.

9. The frame according to claim 1, wherein the laminated lens structure and polymeric material is positioned in the frame such that the polymeric material is nearest the display device when the frame is attached to the display device.

10. The frame according to claim 1, wherein the laminated lens structure and polymeric material is positioned in the frame such that the lens structure is nearest the display device when the frame is attached to the display device.

11. The frame according to claim 10, wherein a spacer is provided between the display device and the lens structure.

12. The lens structure of claim 1, wherein the substrate material is laminated to a crystalline material.

13. The frame according to claim 12, wherein the laminated lens structure and polymeric material is positioned in the frame such that the crystalline material is nearest the display device when the frame is attached to the display device.

14. The frame according to claim 12, wherein the laminated lens structure and crystalline material is positioned in the frame such that the lens structure is nearest the display device when the frame is attached to the display device.

15. The frame according to claim 14, wherein a spacer is provided between the display device and the lens structure.

16. A frame operable for removable attachment to a display device and for viewing at least one image projected by the display device in three dimensions, comprising:
    a frame defining an opening for receiving and maintaining a lens structure, said frame being configured to correspond in size to the display device;
    at least one mounting mechanism extending through the frame and configured to engage and secure the frame to the display device; and
    wherein the lens structure comprises a transparent substrate material having a plurality of lenses located on one side thereof, the plurality of lenses being angled and corresponding to a pixel size and pitch of the display device such that when the frame is attached to the display device the at least one two dimensional image may be viewed in three dimensions, wherein the substrate material is laminated to a crystalline material.

17. The frame according to claim 16, wherein the laminated lens structure and polymeric material is positioned in the frame such that the crystalline material is nearest the display device when the frame is attached to the display device.

18. The frame according to claim 16, wherein the laminated lens structure and crystalline material is positioned in the frame such that the lens structure is nearest the display device when the frame is attached to the display device.

19. The frame according to claim 16, wherein a spacer is provided between the display device and the lens structure.

20. An autostereoscopic system for viewing at least one image in three dimensions, comprising:

a display device configured to project at least one image onto a display screen;

a frame configured to correspond in size to the display device and being removably attached to the display device, said frame defining an opening for receiving and maintaining a lens structure, at least one mounting mechanism extending through the frame and configured to engage and secure the frame to the display device; and wherein the lens structure comprises a transparent substrate material having a plurality of lenses located on one side thereof, the plurality of lenses being angled and corresponding to a pixel size and pitch of the display device such that when the frame is attached to the display device the at least one two dimensional image may be viewed in three dimensions.

\* \* \* \* \*